US012737769B2

(12) United States Patent
Seibert, Jr. et al.

(10) Patent No.: US 12,737,769 B2
(45) Date of Patent: Sep. 15, 2026

(54) SYSTEM AND METHOD FOR PROVIDING GLOBAL TRANSACTION IDENTIFIERS

(71) Applicant: Digits Financial, Inc., San Francisco, CA (US)

(72) Inventors: Jeffrey Hall Seibert, Jr., Hillsborough, CA (US); Brian Hatfield, Cambridge, MA (US); Adrian Stephen Grealish, Malibu, CA (US)

(73) Assignee: Digits Financial, Inc., San Francisco, CA (US)

( * ) Notice: Subject to any disclaimer, the term of this patent is extended or adjusted under 35 U.S.C. 154(b) by 0 days.

(21) Appl. No.: 18/749,232

(22) Filed: Jun. 20, 2024

(65) Prior Publication Data

US 2024/0428256 A1 Dec. 26, 2024

Related U.S. Application Data

(60) Provisional application No. 63/522,251, filed on Jun. 21, 2023.

(51) Int. Cl.
*G06Q 20/42* (2012.01)
*G06Q 20/40* (2012.01)
*G06Q 40/12* (2023.01)

(52) U.S. Cl.
CPC ......... *G06Q 20/425* (2013.01); *G06Q 20/401* (2013.01); *G06Q 40/125* (2013.12)

(58) Field of Classification Search
None
See application file for complete search history.

(56) References Cited

U.S. PATENT DOCUMENTS

| | | | | |
|---|---|---|---|---|
| 8,606,698 | B2 * | 12/2013 | Schultz | G06Q 20/047 705/40 |
| 9,165,076 | B2 * | 10/2015 | Gomez | G06F 16/9554 |
| 10,185,946 | B2 * | 1/2019 | Bowman | G06Q 20/3821 |
| 10,318,941 | B2 * | 6/2019 | Chawla | G06Q 10/10 |
| 12,002,049 | B2 * | 6/2024 | Dimmick | G06Q 20/386 |
| 2018/0349995 | A1 * | 12/2018 | Kunjachan | G06Q 40/04 |
| 2020/0294021 | A1 * | 9/2020 | Poornachandra | G06F 16/9554 |
| 2023/0394478 | A1 * | 12/2023 | Fuentes | G06N 20/00 |

* cited by examiner

*Primary Examiner* — Paul S Schwarzenberg
(74) *Attorney, Agent, or Firm* — Cesari and McKenna, LLP; Omar M. Wadhwa

(57) ABSTRACT

A system and method for providing a global transaction identifier. When a financial services transaction occurs, a globally unique identifier is generated that fits into a truncated description field of a financial services processor provider's statement. Illustratively, this globally unique identifier may take the case of a shortened uniform resource locator (URL) that points to a data structure containing full context information. When a user, accountant, auditor, etc. desires to obtain access to the full context information, they may access the shortened URL, which returns the context information.

14 Claims, 9 Drawing Sheets

SYSTEM AND METHOD FOR PROVIDING GLOBAL TRANSACTION IDENTIFIERS

CROSS-REFERENCE TO RELATED APPLICATIONS

The present application claims the benefit of U.S. Provisional Patent Application Ser. No. 63/522,251, which was filed on Jun. 21, 2023, by Jeffrey Hall Seibert, Jr. et al. for SYSTEM AND METHOD FOR PROVIDING GLOBAL TRANSACTION IDENTIFIERS, which is hereby incorporated by reference.

BACKGROUND

Technical Field

The present invention relates generally to providing context information for a financial transaction and, more particularly, to providing a unique transaction identifier that allows context information to be obtained relating to a financial transaction.

Background Information

The current financial system operates in a non-optimal context sharing environment. Money may be moved from account to account as result of various financial transaction; however, the context of the transaction is not often communicated along with the money. As used herein, the context may include such information as, e.g., payee, products associated with the transaction, etc. Accountants, auditors, etc. typically require the full context of a transaction in order to accurately enter it into a business enterprise's accounting system, to audit the transaction, etc.

Many of the current limitations as to providing context are the result of legacy constraints from computer systems used by financial service providers such as banks, credit card transaction providers, etc. These legacy constraints are typically illustrated by a short transaction description field that is provided by the financial services provider. These transaction description fields may be routinely truncated to a fixed number of characters, e.g., 16 characters in the case of BREX, or may have the contexts of the transaction description field converted to uppercase, such as in the case of American Express credit card statements. These limitations on transaction descriptions do not provide sufficient space to provide necessary context required by accountants, auditors, etc. Therefore, additional work must be done in order to accurately record the transaction in accounting software, etc. This results in wasted man-hours and increases the possibility of errors being introduced into a bookkeeping system.

SUMMARY

The disadvantages of the prior art are overcome by providing a system and method for providing a global transaction identifier. When a financial services transaction occurs, a globally unique identifier is generated that fits into a truncated description field of a financial services processor provider's statement. Illustratively, this globally unique identifier may take the case of a shortened uniform resource locator (URL) that points to a data structure containing full context information. When a user, accountant, auditor, etc. desires to obtain access to the full context information, they may access the shortened URL, which returns the context information.

To provide security and prevent personally identifiable information (PII) from being openly accessible, supplemental information may need to be provided when accessing the shortened URL. Illustratively, this supplemental information may comprise the numeric value, in whatever currency, of the transaction. By requiring both the shortened URL and the numeric value of the transaction, it can be assumed that the person attempting to access the context information has access to the financial service provider's statement. This provides a necessary level of security. Should supplemental information not be provided in a request, redacted context information may be provided.

By providing the context information in a standardized format, such as JSON format, artificial intelligence accounting software may automatically access the context information and integrated into the accounting software. This provides improved processing of the accounting software, eliminates the need for human intervention to manually identify transactions, and enables improved performance.

BRIEF DESCRIPTION OF THE DRA WINGS

The above and further advantages of the present invention may be better understood in relation to the accompanying figures, in which like reference numerals indicate identical or substantially identical elements, of which:

DETAILED DESCRIPTION OF AN ILLUSTRATIVE EMBODIMENT

Figure 1:
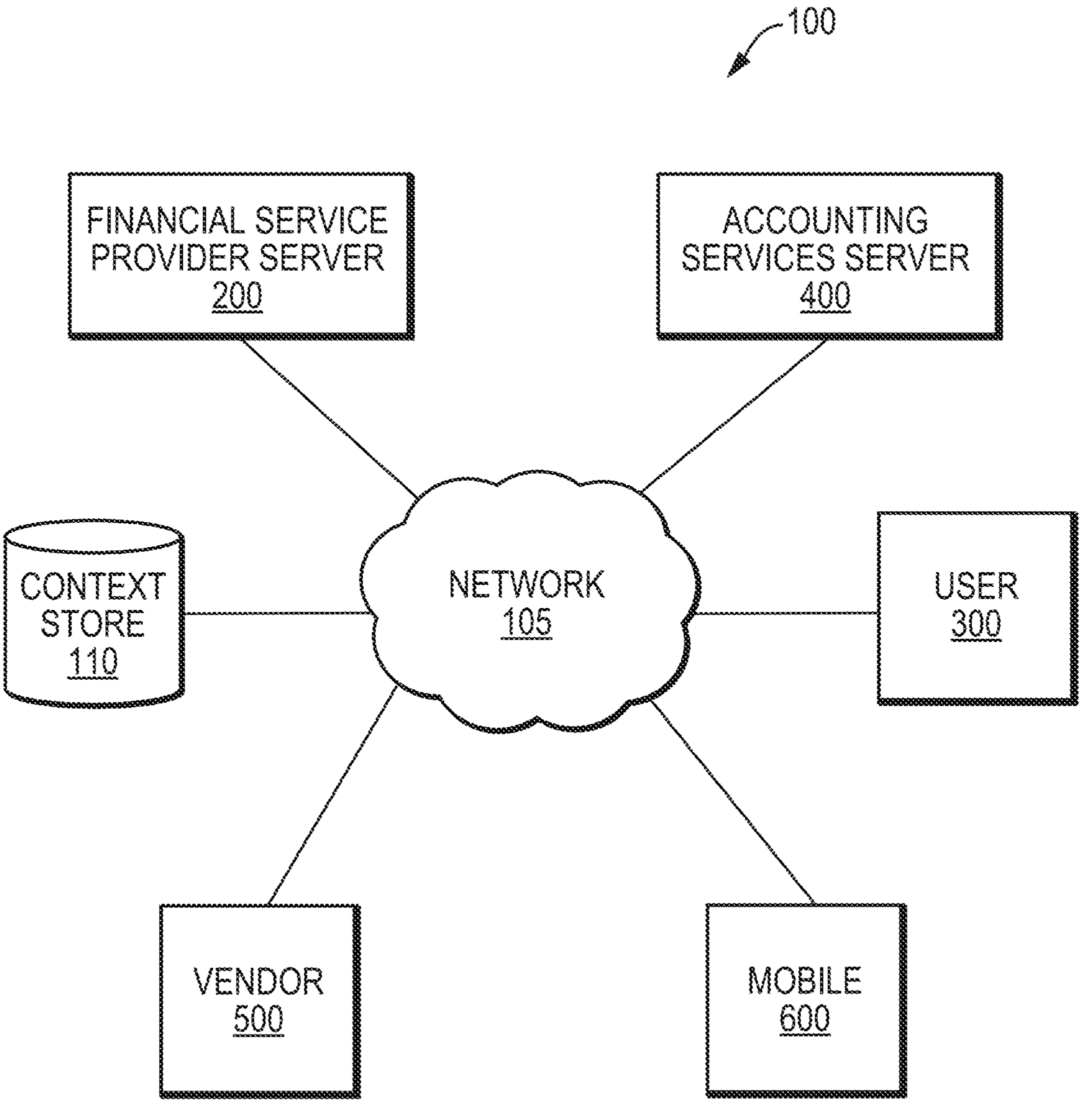
FIG. 1 is a schematic block diagram of an exemplary network environment in accordance with an illustrative embodiment of the present invention.

FIG. 1 is a schematic block diagram of an exemplary computer network environment 100 in accordance with an illustrative embodiment of the present invention. Specifically, the network environment 100 comprises of a network 105 that is operatively interconnected with one or more financial service provider servers 200, users 300, accounting services servers 400, vendors 500, mobile devices 600, and a context data store 110. It should be noted that network 105 is illustratively shown as a single network entity. However, it is expressly contemplated that network 105 may comprise of a plurality of interconnecting networks of the same and/or differing types, including, e.g., Wi-Fi networks, cellular telephone networks, local area networks (LANs), and/or wide area networks (WANs) including, for example, the well-known Internet. The various network connected entities typically communicate over the network 105 by exchanging discrete frames or packets of data according to predefined protocols, such as a Transmission Control Protocol/Internet Protocol (TCP/IP), Hypertext Transfer Protocol (HTTP), etc. Thus, for example, in an illustrative embodiment, a mobile device 600 may communicate using a cellular telephone network to transmit data. The exemplary cellular telephone network may then be interconnected with the Internet, which is further connected to a LAN, which ultimately is operatively connected to financial service provider server 200.

It should be noted that while only a single one of each network element is shown, it is expressly contemplated that in alternative embodiments, a plurality of any of the elements may be utilized. Therefore, the description of a single element should be taken as exemplary only. Further, while the description contained herein is written in terms of client-server relationships, it is expressly contemplated that in alternative embodiments parts, or all, of the software functionality may be cloud based. Therefore, the description of physical servers implementing various functionality should be taken as exemplary only.

The context data store 110 illustratively stores the canonical copy of a context data structure 700, described below in reference to FIG. 7. A context data structure 700 stores contextual information relating to a financial transaction and may be accessed using a unique transaction identifier, which is illustratively a shortened Uniform Resource Locator (URL). As will be appreciated by those skilled in the art, the creation of a shortened URL may be accomplished using any well-known technique or service providers, such as, Bitly, Tiny.cc, TinyURL, etc.

In operation, as part of the process of performing a financial transaction, a context data structure 700 is created. Once created, any of the participants involved with the financial transaction (e.g., financial service provider, payor, payee, accounting service provider, etc.) may add information to the context data structure 700. Illustratively, the context data structure is stored in context data store 110. It should be noted that in environment 100, the context data store 110 is shown as a separate network entity; however, in operation, any of the other network entities may act as a context data store 110. For example, the accounting services server 400 may act as the context data store 110 as part of the accounting services provided to a user 300.

Each of the other network systems 200, 300, 400, 500, and 600 may also store additional information that may be linked to the information in the context data structure 700. In accordance with illustrative embodiments of the invention, the context data structure 700 may be utilized by various systems to obtain information relating to a transaction. As described herein, the amount of information that may be shared may vary depending on a user's permission level, logged in status, etc. It is expressly contemplated that some information may be available globally regardless of permission status, while a sliding scale of additional information relating to a transaction may be available depending on a user's permission levels and/or role/function within an organization.

For example, the name of the vendor and a dollar amount of a transaction may be available to those not logged in/without any special permissions. A first level of permissions may enable a user to see additional information, e.g., that the transaction was charged to a particular credit card. A second level of permissions may enable a user to see related transactions, whether the credit card had been paid, etc. A third level of permissions may enable a user to view the receipt associated with the transaction. As will be appreciated by those skilled in the art, differing numbers of permission levels and/or differing permissions may be used in alternative embodiments of the present invention. Therefore, the description of particular numbers of permission levels, permissions available at each level, etc. should be taken as exemplary only.

Figure 2:
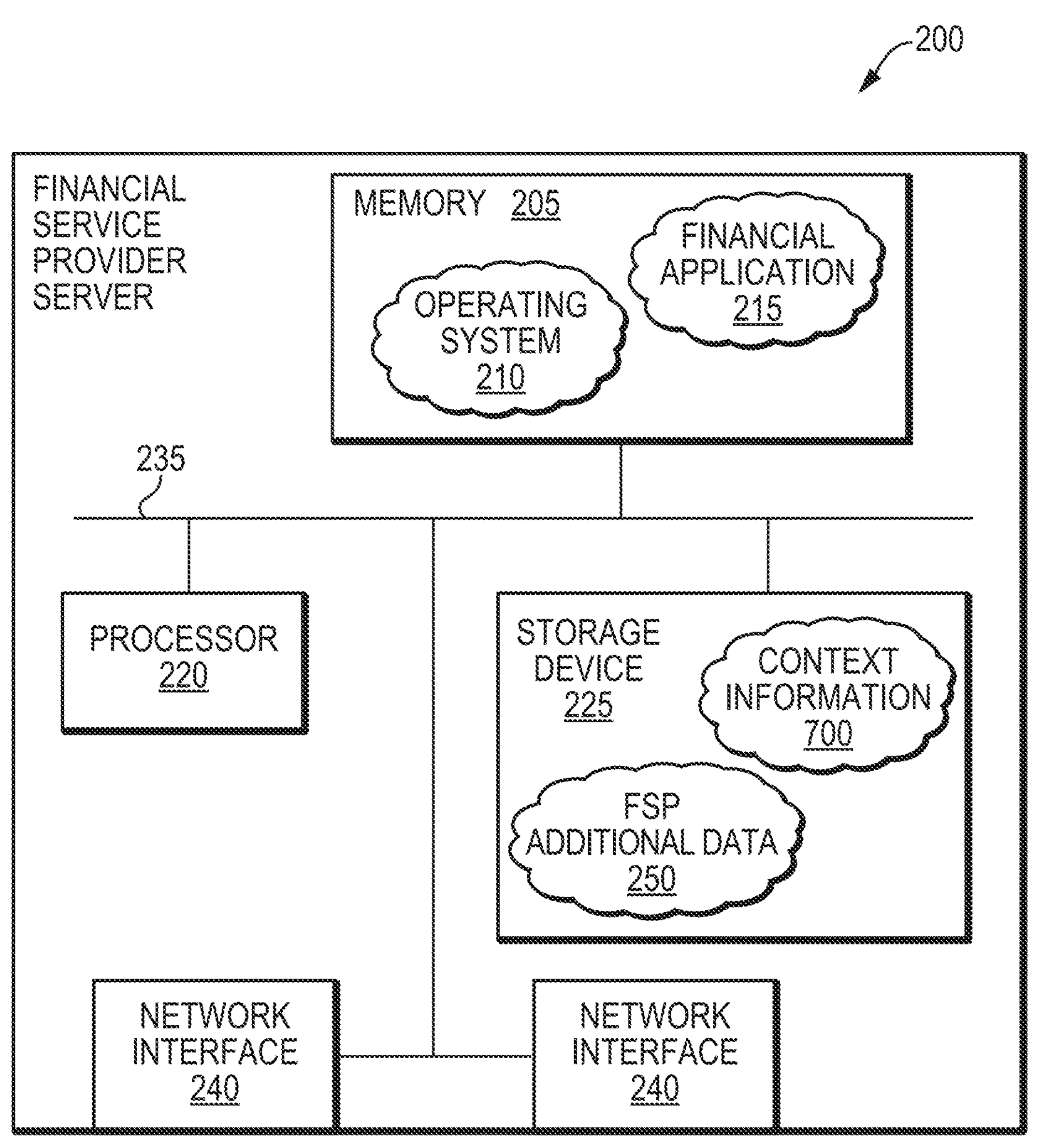
FIG. 2 is a schematic block diagram of an exemplary financial service provider server system in accordance with an illustrative embodiment of the present invention.

FIG. 2 is a schematic block diagram of an exemplary financial service provider server 200 in accordance with an illustrative embodiment of the present invention. As used herein, a financial service provide may comprise of a bank, credit card processor, payment service, etc., More generally, a financial service provider is any entity that effectuates a transfer of money, credit, etc. The server 200 may illustratively comprise of one or more network interfaces 240, one or more processors 220, one or more storage devices 225, and a memory 205 operatively interconnected by a system bus 235.

The network interface 240 illustratively contains the mechanical, electrical, and signaling circuitry for communicating data over physical links coupled to a network. The network interface may be configured to transmit and/or receive data using a variety of different communication protocols, including, inter alia, TCP/IP, UDP, ATM, SONET, HTTP, wireless protocols, Frame Relay, Ethernet, Fiber Distributed Data Interface (FDDI), etc. Notably, a physical network interface 240 may also be used to implement one or more virtual network interfaces, such as for Virtual Private Network (VPN) access, as is known to those skilled in the art.

The memory 205 comprises a plurality of locations that are addressable by the processor(s) 220 and the network interface 240 for storing software programs and data structures associated with the various embodiments described herein. The processor 220 may comprise necessary elements or logic adapted to execute software programs and manipulate data structures. An operating system 210, portions of which are typically resident in memory 205 and executed by the processor(s), functionally organizes the server 200 by, inter alia, invoking network operations in support of software processes and/or services executing on the server.

A financial application 215 is stored in memory 205 and executed by processor 220 to implement the financial transaction functions of the server. These may vary depending on the type of financial service provider. For example, a bank's financial application 215 may implement various banking functionality including, e.g., check clearing, ACH transfers, wire transfers, account management, etc. A credit card provider's application software 215 would implement the acceptance/declination of credit card purchases, handle chargebacks/refunds, account preparation and distribution, etc.

The storage device 225, which may be internal or external to the server 200, stores data. In alternative embodiments, storage device 225 may comprise a plurality of devices, which may be internal and/or external to server 200. Storage device 225 may comprise a cloud-based storage, RAID array, etc. in accordance with alternative embodiments of the present invention. Illustratively the storage device may persistently store context information 700, described below in reference to FIG. 7, associated with financial transactions.

In operation, and as described further below, when the financial application 215 processes a financial transaction, context information may be stored in data structure 700 identified by a unique transaction identifier. If a request is later received by, e.g., the application 215, to retrieve the context information, the application will return the context information, either redacted or unredacted, as described further below.

It should be noted that the server 200 may not have a complete set of context information 700 unless it is serving as the role of the context data store 110. Server may store context information that it generated, e.g., an amount of the transaction and the payee, etc.

Additional financial service provider data 250 may also be stored in storage device 225. The additional financial service provider data 250 may comprise related data objects that are referred to by the context data structure 700. Such additional data may comprise, e.g., payment information, paid status, related transaction information, etc.

In alternative embodiments of the present invention, the various functionalities may be distributed among a plurality of servers. As such, the description of a single server 200 should be taken as exemplary only. Also, while the embodiments herein are described in terms of processes or services implemented as software executing on a processor, alternative embodiments may include the processes described herein being embodied as modules consisting of hardware, software, firmware, and/or combinations thereof. Therefore, the description of software applications should be taken as exemplary only.

Figure 3:
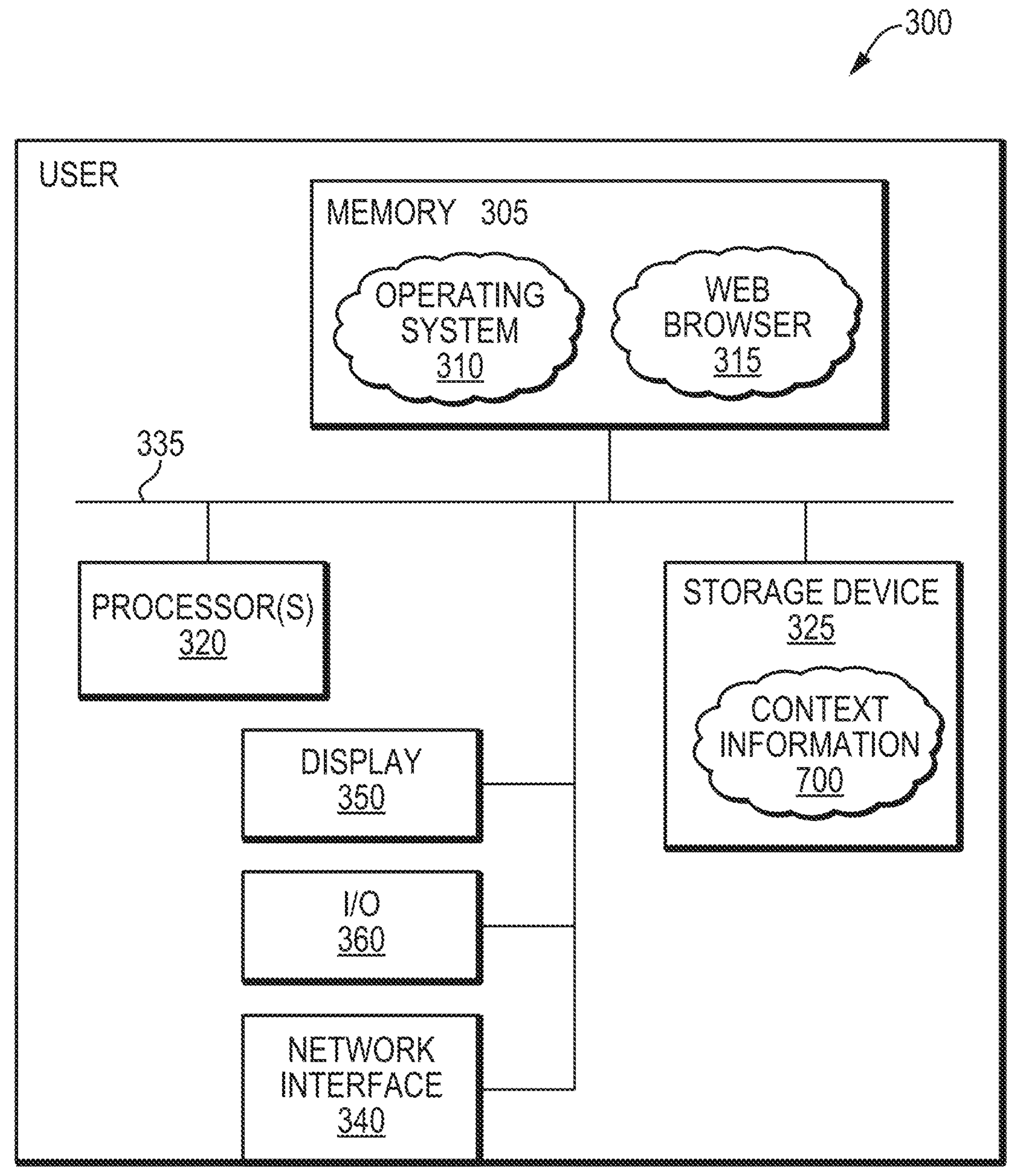
FIG. 3 is a schematic block diagram of an exemplary user computer system in accordance with an illustrative embodiment of the present invention.

FIG. 3 is a schematic block diagram of an exemplary user computer system 300 in accordance with an illustrative embodiment of the present invention. The user computer system 300, illustratively comprises a memory 305, one or more processors 320, one or more storage devices 325, a network interface 340, a display 350, and one or more forms of input/output (I/O) 360 that all operatively interconnected by a system bus 335. Memory 305, processors 320, storage device 325, and network interface 340 illustratively perform similar functions as described above in relation to server 200.

The display 350 may illustratively comprise a conventional liquid crystal display (LCD) or light emitting diode (LED) computer monitor or other visual display as are known to those skilled in the art. The I/O system 360 may comprise, for example, a keyboard, mouse, light pen, touchscreen and/or other forms of inputting data and manipulating GUI elements in accordance with various embodiments of the present invention. In one illustrative embodiment, the I/O may comprise a keyboard and mouse that may be utilized to enter data and to rearrange a plurality of GUI windows.

Memory 305 stores an operating system 310. A web browser 315 enables a user of the user computer system 302 to access context information 700 via, e.g., a shortened URL. It should be noted that in alternative embodiments, other software may execute on user computer 300 that may access context information 700. Therefore, the description of a web browser 315 should be taken as exemplary only.

In alternative embodiments, the user may store some context information 700. This may be context information that is generated by the user, e.g., a particular internal account number, etc. Further, additional user data 370 may be stored in storage device 325. This additional user data may be utilized in conjunction with the context data information 700 to provide an improved user experience in accordance with illustrative embodiments of the present invention.

Figure 4:
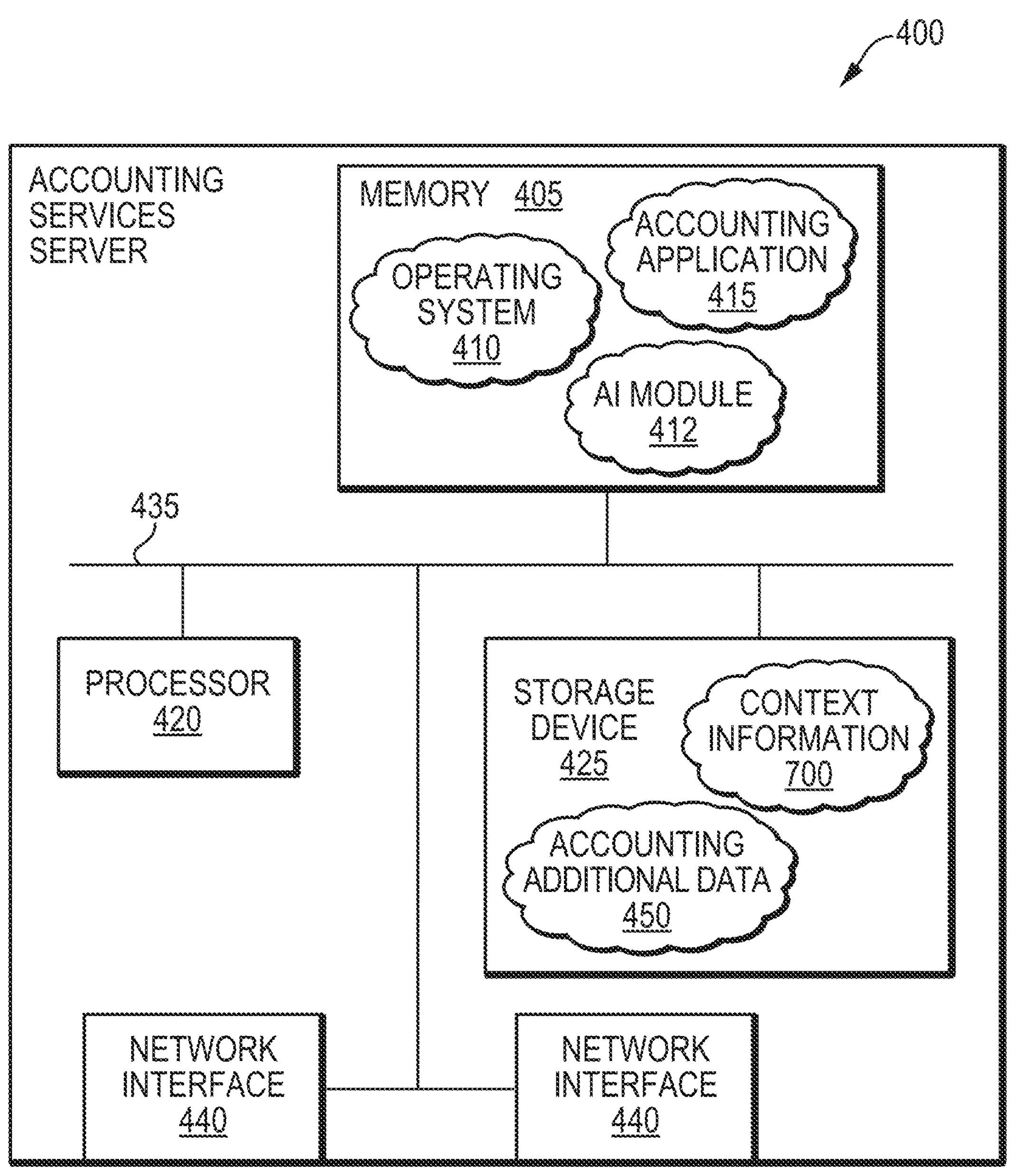
FIG. 4 is a schematic block diagram of an exemplary accounting service provider server system in accordance with an illustrative embodiment of the present invention.

FIG. 4 is a schematic block diagram of an exemplary accounting services server 400 in accordance with an illustrative embodiment of the present invention. The accounting services server 400, illustratively comprises a memory 405, one or more processors 420, one or more storage devices 425, a network interface 440 all operatively interconnected by a system bus 435. Memory 405, processors 420, storage device 425, and network interface 440 illustratively perform similar functions as described above in relation to server 200.

Memory 405 stores an operating system 410 an artificial intelligence module 412, and an exemplary accounting application 415. Accounting application 415 may implement an accounting software package to enable an accountant to monitor an enterprise's books. More generally, the accounting application 415 may access context information 700, stored locally or on other servers, to obtain necessary information to properly book a financial transaction or a business entity. Similar to server 200, the server 400 may not have the complete context information 700 unless it is serving as the role of the context data store 110.

The AI module 412 may implement various functionalities in conjunction with accounting application 415. It should be noted that while AI module 412 is shown as a separate module, it may be integrated into accounting application 415 in alternative embodiments of the present invention. Therefore, the description and depiction as a separate module should be taken as exemplary only.

In accordance with alternative embodiments of the present invention, the AI module may use context information, including context data structure 700, to provide added features to accounting application 415. For example, in one illustrative embodiment, AI module 412 may analyze context information 700 to show related transactions. A user may specify a category and the AI module may then create a curated list of related transactions tied to that category. Further, AI module may enable suggestions and/or predictions for classifying transactions within accounting application 415.

In alternative embodiments, the AI module 412 may be utilized in conjunction with other AI systems, e.g., ChatGPT, etc., to provide an interactive chat experience. For example, a user may ask "What invoices from vendor X have not been paid?" and the system may utilize context information 700 to generate a suitable response. As will be appreciated by those skilled in the art, this capability may be limited based on a user's logged in/out status, as well as individual permissions that may be set within accounting application 415, AI module 412, etc.

Figure 5:
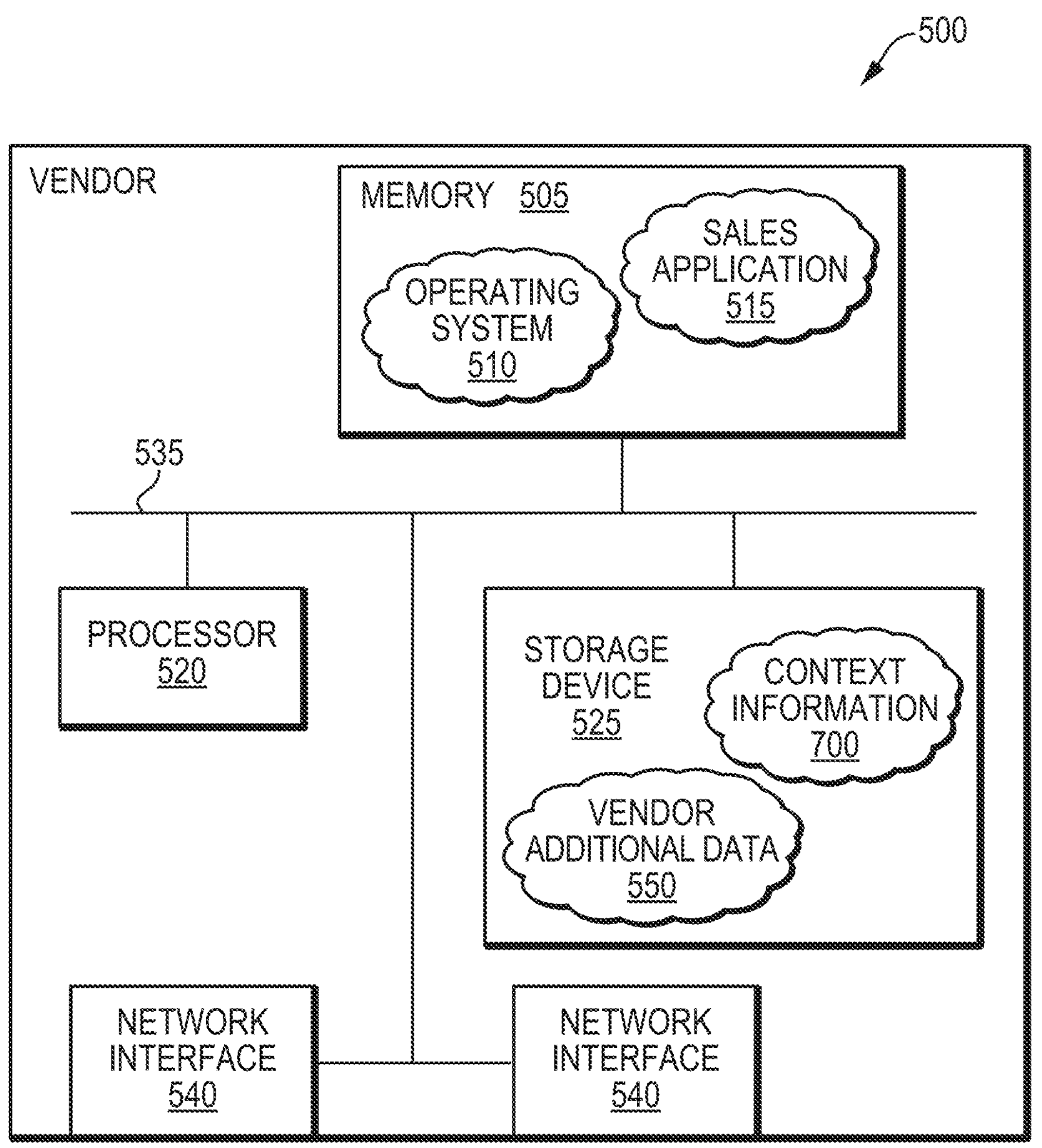
FIG. 5 is a schematic block diagram of an exemplary vendor service provider server system in accordance with an illustrative embodiment of the present invention.

FIG. 5 is a schematic block diagram of an exemplary vendor computer system 500 in accordance with an illustrative embodiment of the present invention. The vendor computer system 500, illustratively comprises a memory 505, one or more processors 520, one or more storage devices 525, a network interface 540 all operatively interconnected by a system bus 535. Memory 505, processors 520, storage device 525, and network interface 540 illustratively perform similar functions as described above in relation to server 200.

Memory 505 stores an operating system 510 and a sales application 515. Sales application 515 may enable online sales to occur to a user. In operation, when a sales occurs, and a financial transaction is completed, context information 700 associated with the transaction may be generated and stored in storage device 525. As noted above, the vendor 500 may not have complete context information 700 unless it is serving as the context data store 110. As described further below, the context information 700 may be retrieved at a later time to enable accounting software, etc. to properly understand a particular financial transaction. Storage device 525 may also store additional vendor data 550 that may be used in conjunction with the context information 700 in accordance with illustrative embodiments of the present invention.

Figure 6:
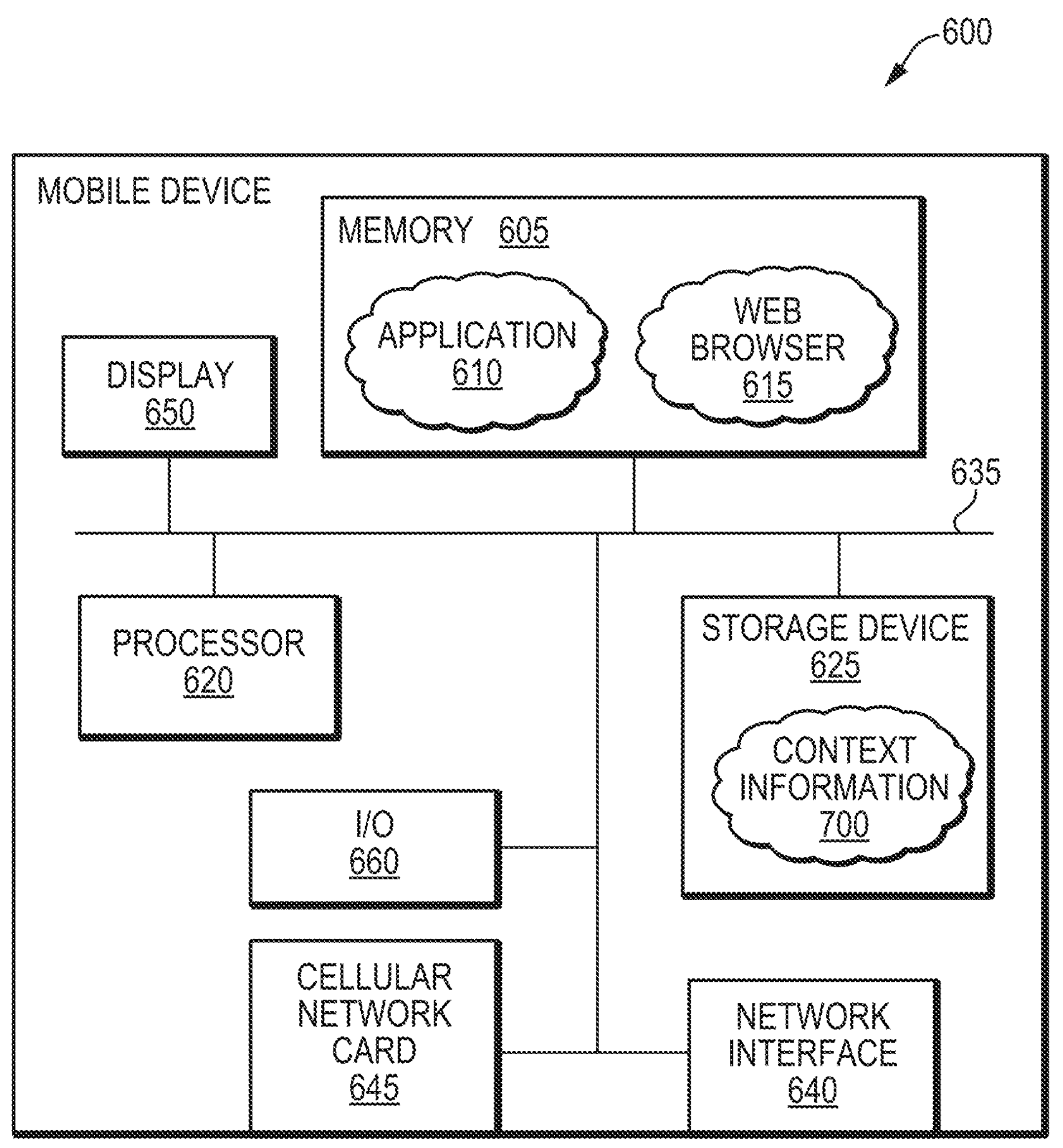
FIG. 6 is a schematic block diagram of an exemplary mobile device in accordance with an illustrative embodiment of the present invention.

FIG. 6 is a schematic block diagram of an exemplary mobile device 600 in accordance with an illustrative embodiment of the present invention. As noted above, mobile device 600 may comprise any device capable of executing applications and/or accessing the World Wide Web. Illustratively, mobile device 600 may comprise a smart phone, a personal digital assistant (PDA), and/or a tablet computer. The mobile device 600 illustratively comprises network interfaces 640, one or more processors 620, a memory 605, a storage device 625, and a cellular network card 645 interconnected by a system bus 635.

Memory 605, processor 620, storage device 625, I/O 660, and network interface 640 function similarly to those components described above. Display 650 may comprise a touchscreen that is used for both display and input purposes. Cellular network card 645 may implement the circuitry to enable the mobile device to access one or more cellular networks for, e.g., data transmission and reception.

Memory 605 stores an operating system 610 and a web browser 615. The web browser may be utilized by a user to access a unique transaction identifier, e.g., a shortened URL, to obtain context information 700 stored remotely.

In alternative embodiments, the mobile device 600 may store some context information 700 locally. Such information may be contributed to the entity serving as the context data store 110. Additional data 670 may also be stored in storage device 625. The additional data may be used with context information 700 in accordance with illustrative embodiments of the present invention.

Figure 7:
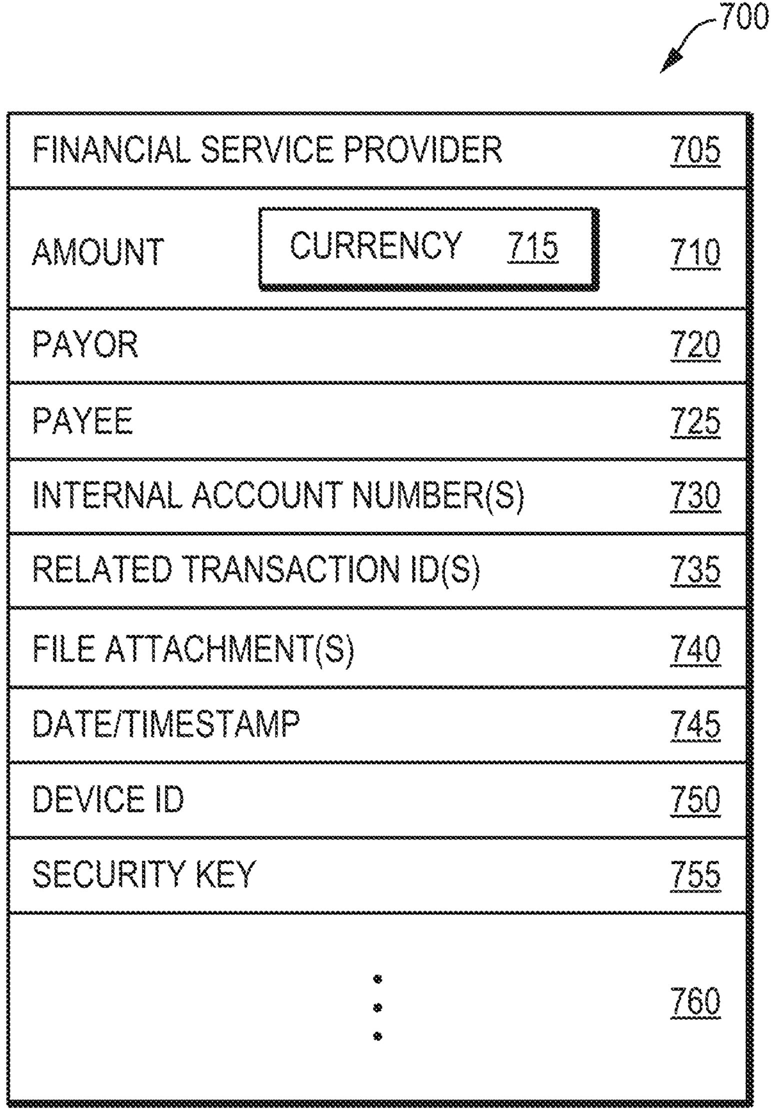
FIG. 7 is a schematic block diagram of an exemplary context information data structure in accordance with an illustrative embodiment of the present invention.

FIG. 7 is a block diagram of an exemplary context information data structure 700 in accordance with an illustrative embodiment of the present invention. In accordance with an exemplary embodiment of the present invention, the context data structure 700 may be implemented using JavaScript Object Notation (JSON). However, it should be noted that in accordance with alternative embodiments of the present invention, the context data structure 700 may be implemented using alternative data formats. Therefore, the description of JSON should be taken as exemplary only. Further, it should be noted that in accordance with alternative embodiments of the present invention, differing entities may utilize differing context data structure formats. Therefore, it is expressly contemplated that a plurality of differing formats may be utilized in accordance with alternative embodiments of the present invention.

Exemplary context data structure 700 includes a plurality of fields, including a financial service provider field 705, an amount field 710, a payor field 720, a payee field 725, internal account number field 730, a related transaction identifier field 735, a file attachment field 740, a date/timestamp field 745, a device identifier field 750, a security key field 755 and in accordance with alternative embodiments, additional fields 760.

The financial service provider field 705 identifies the financial service provider that performed the financial service transaction. This may identify a bank, credit card processor, payment processing, service, etc. As each transaction typically includes two financial service providers, e.g., a payor's bank and a payee's bank, there may be a plurality of financial service provider fields 705 in data structure 700. Therefore, the depiction of a single field 705 should be taken as exemplary only. The amount field 710 illustratively identifies a numeric value of the transaction. In accordance with alternative embodiments of the present invention, a currency subfield 715 may identify the currency in which the transaction occurred. As will be appreciated by those skilled in the art, in alternative embodiments, additional fields (not shown) may be utilized to show the currency in which the transaction originally occurred and a second currency in which the bookkeeping or accounting entry is made. For example, a credit card transaction may occur in the European Union and is therefore processed in euros. However, if the credit card is based in the United States, the credit card provider will convert the euros into dollars at a predetermined exchange rate. Thus, in this example, exemplary amount field 710 may include subfields (not shown) that identify the amount in euros as well as the amount in dollars.

The payor field 720 identifies the entity that initiated the movement of the funds of the financial services transaction. The payee field 725 identifies the recipient of the funds of the financial services transaction. The internal account numbers field 730 identifies any internal accounts associated with the payor/payee. For example, if the financial services transaction is associated with a purchase of advertising, internal account field 730 may identify the internal marketing account for the payor. This would enable accounting software to automatically categorize and properly assign the financial transaction to the suitable general ledger account.

The related transaction identifier field 735 identifies any related transactions. For example, should a refund be issued for a purchase, the related transaction identifier field 735 may identify the financial transaction associated with the original purchase. Again, this enables accounting software to rapidly match related transactions so that they are appropriately booked into the accounting software.

The file attachments field 740 enables one or more files (or other data structures) to be included within the context information data structure 700. Exemplary file attachments may include, e.g., an invoice, a purchase order, a purchase and sale agreement, etc. By including such files within the context data structure 700, accounting software may rapidly obtain such files and integrate them into the accounting software's own data store.

The date/timestamp field 745 stores the date and time when the financial transaction occurred. The device identifier field 750 may store a unique device identifier of, e.g., a mobile device that initiated the financial transaction. Such device ID may be utilized for fraud prevention by identifying which particular mobile device initiated a transaction The security key field 755 may be utilized to store one or more security keys used to limit access to the context information. The security key field 755 may be utilized to store a password that is required to access the context data structure 700. In alternative embodiments, a plurality of differing passwords may be stored in field 755. These differing passwords may be associated with differing parties to the transaction, e.g., payor, payee. Each other field may be tagged with an identifier (not shown) that indicates which password(s) are needed to view the contents of a particular field. Or example, one password may be needed to view the contents of the internal account number field 730 storing the payor's internal account number, while a differing password may be needed to see the internal account number associated with the payee. In this way, a single context data structure may store data that is only accessible to certain users.

The additional fields 760 may comprise a number of differing fields that may be specific to certain industries, particular types of transactions, etc.

It should be noted that a particular layout of a context data structure 700 is shown and described herein. However, it is expressly contemplated that any variation of the context data structure may be utilized in accordance with alternative embodiments of the present invention. Therefore, the description of a context data structure 700 contained herein should be taken as exemplary only.

Figure 8:
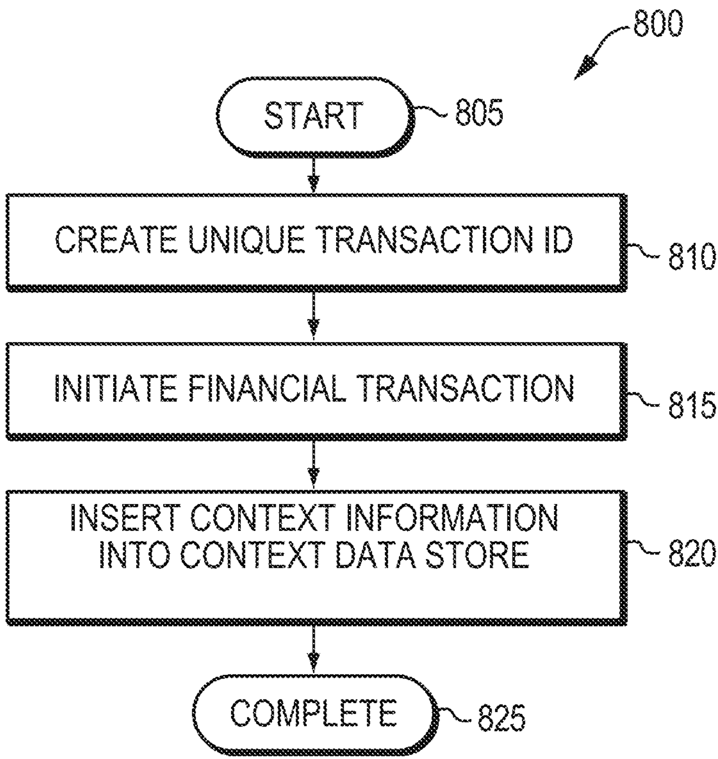
FIG. 8 is a flowchart detailing the steps of a procedure for associating a unique transaction identifier with a financial service transaction in accordance with an illustrative embodiment of the present invention.

FIG. 8 is a flowchart detailing the steps of an exemplary procedure 800 for generating a unique transaction identifier in accordance with an illustrative embodiment of the present invention. The procedure 800 begins in step 805 and continues to step 810 where a unique transaction identifier is created. Illustratively, this unique identifier is a shortened Uniform Resource Locator (URL) that may be generated using any conventional URL shortening services, such as Bitly, TinyURL, etc.

At step 815, the financial transaction is initiated and is linked to the generated unique transaction identifier. This may be accomplished by, e.g., inserting the unique transaction identifier into the transaction description field that already exists in the financial service provider's application software. In this way, the application software's functionality may be improved without requiring any upgrades/changes to the software itself. This enables improved operation of the financial service provider's server. As many of these systems are legacy systems in which upgrades or changes may be impractical, the present invention improves upon the operation while maintaining the legacy status of the system.

In step 820, context information is inserted into the context data structure 700 stored at the context data store 110. It should be noted that while step 820 is shown after steps 810 and 815, context information may be stored in data structure 700 at any time. For example, when the unique transaction identifier is created, some context information may be added. Similarly, when the financial transaction is initiated, additional information may be added. Therefore, the description of step 820 occurring after steps 810 and 815 should be taken as exemplary only. It should be noted that various entities may have partial context information that is created during operation. This context information needs to be sent to whatever entity is functioning as the context data store. This may be accomplished using any technique. For example, each entity may push context information to the context data store. Alternatively, the context data store may retrieve the information from various entities. As will be appreciated by those skilled in the art, a plurality of differing techniques may be utilized to ensure that all context information is transferred to the context data store.

The procedure 800 then completes in step 825.

Figure 9:
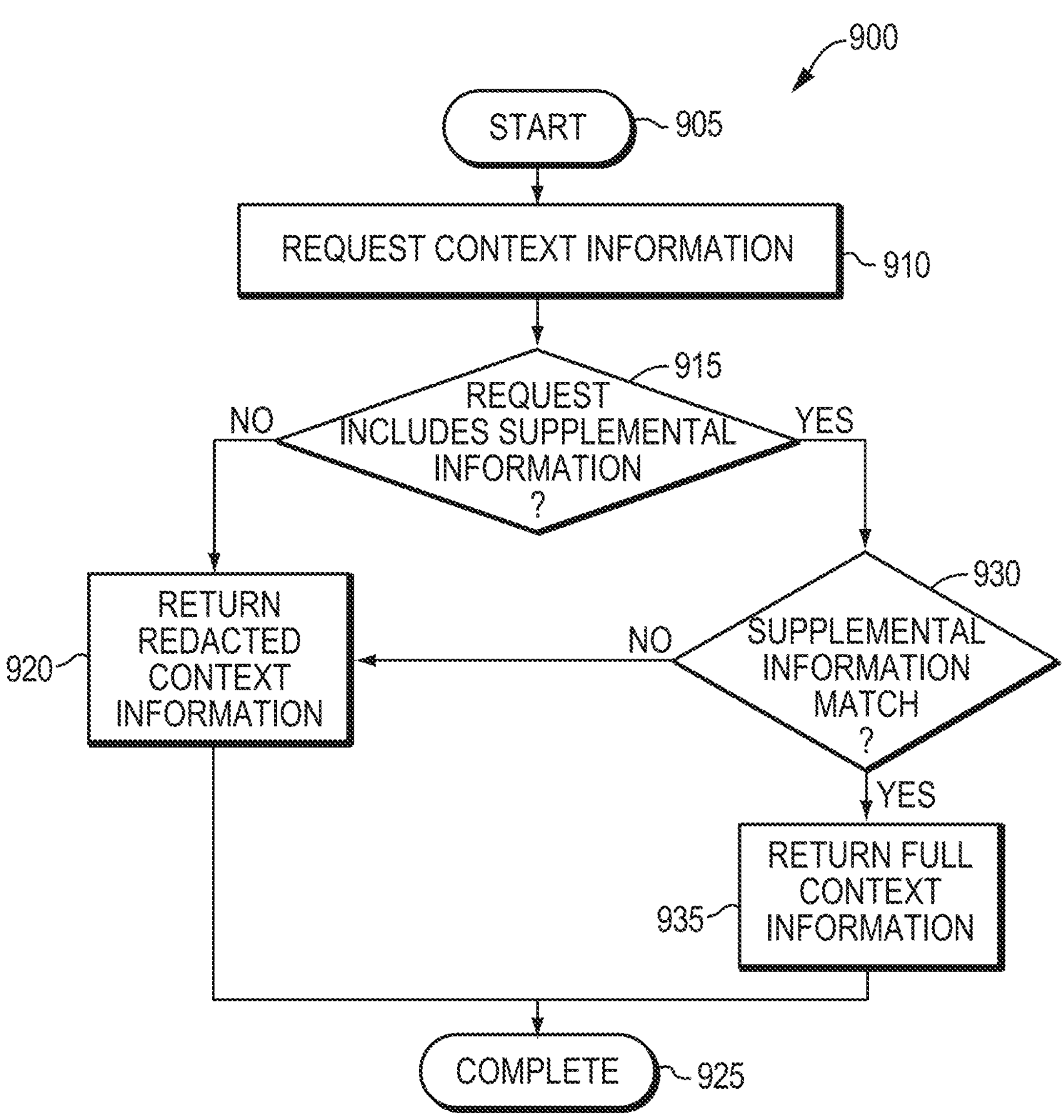
FIG. 9 is a flowchart detailing the steps of a exemplary procedure for retrieving context information in accordance with an illustrative embodiment of the present invention.

FIG. 9 is a flowchart detailing the steps of an exemplary procedure 900 in accordance with an illustrative embodiment of the present invention. The procedure 900 begins in step 905 and continues to step 910 where context information is requested. This request may be made by attempting to access the shortened URL (unique transaction identifier) associated with a particular financial transaction. In alternative embodiments, the request may also include supplemental information, such as the numeric value of the transaction. In alternative embodiments of the present invention, the supplemental information may comprise a logged in/out status, user permission level, etc.

A determination is made in step 915 whether the request includes supplemental information. If supplemental information is not included in the request, the procedure branches to step 920 where redacted context information is returned. The procedure 900 then completes in step 925.

However, if in step 915, it is determined that supplemental information is provided, the procedure branches to step 930 to determine whether the supplemental information matches that contained within the context information. If not, the procedure branches to step 920 and redacted context information is returned. However, if the supplemental information matches, the procedure continues to step 935 where full context information is returned. It should be noted that exemplary flowchart 900 details the example where the supplementary information comprises a value. In alternative embodiments, where the supplemental information is something other than (or in addition to) the value, step 930 may comprise the step of examining the supplemental information to ensure that the requested additional context information is permitted. For example, the supplemental information may comprise a security token (or other credential) that identifies the user as someone who has certain permissions. In these alternative embodiments, step 930 will determine whether those permissions allow the desired additional information to be provided to the user in step 935.

The procedure then completes in step 925.

Further, while this description has been written in terms of a financial software system, the principles of the present invention may be utilized with any form of software system that needs to transfer context information with a limited stat field. As such, the description of a financial system should be taken as exemplary only. While various components have been described as being implemented in hardware or software, it should be noted that it is expressly contemplated any of the functionality described herein may be implemented in hardware, software, firmware, or a combination thereof.

What is claimed is:

1. A computer implemented method comprising the steps of:

creating a unique transaction identifier for a context data structure, wherein the unique transaction identifier comprises a shortened uniform resource locator that points to the context data structure;

initiating a financial transaction between a first party and a second party, wherein the financial transaction is associated with the unique transaction identifier; and linking the financial transaction to the unique transaction identifier by inserting the unique transaction identifier into an existing transaction description field of a financial service provider computer software application, wherein the financial service provider computer software application is not modified to perform the linking because the existing transaction description field is utilized for the linking;

storing context information, corresponding to the financial transaction, in the context data structure, wherein the context information defines the financial transaction;

storing the context data structure in a context data store;

receiving, by a particular party related to the financial transaction, a request for information stored in the context data structure;

determining if the request includes supplemental information;

in response to determining that the request does not include supplemental information, providing redacted context information from the context data structure for display on a computing device; and in response to determining that the request includes the supplemental information, providing unredacted context information from the context data structure for display on the computing device.

2. The computer implemented method of claim 1 wherein a first set of fields of the context information is only accessible to one of the first and second parties.

3. The computer implemented method of claim 2 wherein the first set of fields of the context data structure are associated with a first security key.

4. The computer implemented method of claim 2 wherein a second set of fields of the context data structure are associated with a second security key.

5. The computer implemented method of claim 1 wherein the context data store is associated with an accounting service provider.

6. The computer implemented method of claim 1 wherein the context data store is associated with a financial service provider.

7. The computer implemented method of claim 1 wherein storing context information in the context data structure comprises storing, by the first party, one of more fields of context information.

8. The computer implemented method of claim 1 wherein storing context information in the context data structure comprises storing, by the second party, one of more fields of context information.

9. The computer implemented method of claim 1 wherein storing context information in the context data structure comprises storing, by a third party, one of more fields of context information.

10. The computer implemented method of claim 1 further comprising sending a request to access the context information by utilizing the unique transaction identifier.

11. The computer implemented method of claim 1 wherein the supplemental information comprises at least a value of the financial transaction.

12. The computer implemented method of claim 1 wherein the supplemental information comprises a security key.

13. The computer implemented method of claim 1 further comprising:

receiving a query by an artificial intelligence software of a server, the artificial intelligence software comprising executable instructions stored in memory and executed by one or more processor of the server;

analyzing, the context information by the executing the artificial intelligence software on the one or more processor of the server; and responding to the received query using data contained within the context information.

14. A computer implemented method comprising the steps of:

creating a unique transaction identifier for a context data structure, wherein the unique transaction identifier comprises a shortened uniform resource locator that points to the context data structure;

initiating a financial transaction between a first party and a second party, wherein the financial transaction is associated with the unique transaction identifier; and linking the financial transaction to the unique transaction identifier by inserting the unique transaction identifier into an existing transaction description field of a financial service provider computer software application;

storing context information, corresponding to the financial transaction, in the context data structure, wherein the context information defines the financial transaction;

storing the context data structure in a context data store;

receiving, by a particular party related to the financial transaction, a request for information stored in the context data structure;

determining if the request includes supplemental information;

in response to determining that the request does not include supplemental information, providing redacted context information from the context data structure for display on a computing device; and in response to determining that the request includes the supplemental information, providing unredacted context information from the context data structure for display on the computing device.

* * * * *